US012519215B2

(12) United States Patent
Jadidian et al.

(10) Patent No.: US 12,519,215 B2
(45) Date of Patent: Jan. 6, 2026

(54) OPTICALLY TRANSPARENT ANTENNAS ON TRANSPARENT SUBSTRATES

(71) Applicant: Microsoft Technology Licensing, LLC, Redmond, WA (US)

(72) Inventors: Jouya Jadidian, Los Gatos, CA (US); Erik Alan Holverson, Redmond, WA (US); Ruben Caballero, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 18/639,813

(22) Filed: Apr. 18, 2024

(65) Prior Publication Data

US 2024/0266722 A1     Aug. 8, 2024

Related U.S. Application Data

(63) Continuation of application No. 17/449,073, filed on Sep. 27, 2021, now Pat. No. 11,984,653.

(51) Int. Cl.
*H01Q 1/36* (2006.01)
*H01Q 1/27* (2006.01)
*H01Q 1/38* (2006.01)

(52) U.S. Cl.
CPC ............ *H01Q 1/364* (2013.01); *H01Q 1/273* (2013.01); *H01Q 1/38* (2013.01)

(58) Field of Classification Search
CPC .......... H01Q 1/364; H01Q 1/273; H01Q 1/38; H01Q 1/1271; H01Q 1/44; H01Q 5/307; H01Q 21/28; G02B 27/0172; G02B 2027/0178
See application file for complete search history.

(56) References Cited

U.S. PATENT DOCUMENTS

2022/0041890 A1* 2/2022 Kumta ................. C09D 177/04
2023/0067343 A1* 3/2023 Zhang ...................... H01Q 9/30

* cited by examiner

*Primary Examiner* — David E Lotter
(74) *Attorney, Agent, or Firm* — Alleman Hall & Tuttle LLP

(57) ABSTRACT

Examples are disclosed related to optically transparent antennas. One example provides a proximity sensor, comprising an electrically insulating substrate that is at least partially optically transparent, one or more antennas disposed on the electrically insulating substrate, each antenna comprising a film of a conductive material that is at least partially optically transparent, the one or more antennas comprising a proximity sensing antenna, and a resonant LC circuit electrically coupled to the proximity sensing antenna, the resonant LC circuit configured to output a signal responsive to a position of a surface relative to the proximity sensing antenna.

20 Claims, 5 Drawing Sheets

OPTICALLY TRANSPARENT ANTENNAS ON TRANSPARENT SUBSTRATES

CROSS REFERENCE TO RELATED APPLICATIONS

This application is a continuation of U.S. patent application Ser. No. 17/449,073, filed Sep. 27, 2021, the entirety of which is hereby incorporated herein by reference for all purposes.

BACKGROUND

Mobile computing devices commonly include one or more antennas configured for wireless communication with other devices. Communication antennas are often incorporated into the chassis of computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to antennas formed on optically transparent structures. One example provides a device comprising an electrically insulating substrate that is at least partially optically transparent, one or more antennas disposed on the electrically insulating substrate, each antenna comprising a film of a conductive material that is at least partially optically transparent, the one or more antennas comprising a communication antenna, and processing circuitry electrically coupled to the communication antenna, the processing circuitry configured to one or more of send or receive signals via the communication antenna.

DETAILED DESCRIPTION

Antenna placement on mobile devices having relatively small form-factors, such as head-mounted display (HMD) devices, can be challenging. For example, placing an antenna above a near-eye display system of an HMD device may result in a relatively bulky device. As another option, an antenna may be formed in the device frame near a temple or above an ear of the user. However, wearable computing devices may have constraints on heat generation and electromagnetic (EM) radiation emission proximate to a wearer's body. As such, placing an antenna relatively close to the head of a user, or close to other device components, may impose limits on antenna power and functionality. Further, forming cutouts in the device frame to define the antenna can weaken the device frame.

Accordingly, examples are disclosed that relate to optically transparent antennas formed on optically transparent substates, such as on a see-through display of an HMD device. For example, one or more communication antennas may be formed on a transparent lens of an augmented reality HMD device, such that a user may view real-world imagery through the communication antenna(s). In another example, one or more proximity sensing antennas configured to detect facial movements and poses of a user can be formed on a transparent lens of an HMD device. Placing transparent antennas on lenses may take advantage of the under-utilized space of the lens surface on smaller form factor devices while avoiding any integrity and/or weight issues that may be associated with antennas formed in a device chassis. Transparent antennas formed from thin films also may be relatively lower cost and lower weight than other antenna options. Additionally, an antenna incorporated into a lens system of a wearable computing device allows for an EM radiation-emitting element to be placed further from the human head compared to antenna placements within the temple pieces of the frame, and thereby may avoid constraints on antenna transmission power. Further, locating motion sensing antennas on a lens system may provide a relatively clear coupling path to sensing targets for facial expression recognition (e.g., eyes, brows, eyelids, cheeks, lips, chin, etc.) compared to locating such antennas on a device frame. The term "transparent antenna" and the like as used herein indicates an antenna that is at least partially transparent to visible wavelengths of light, thereby allowing a user to see through the antenna.

Figure 1:
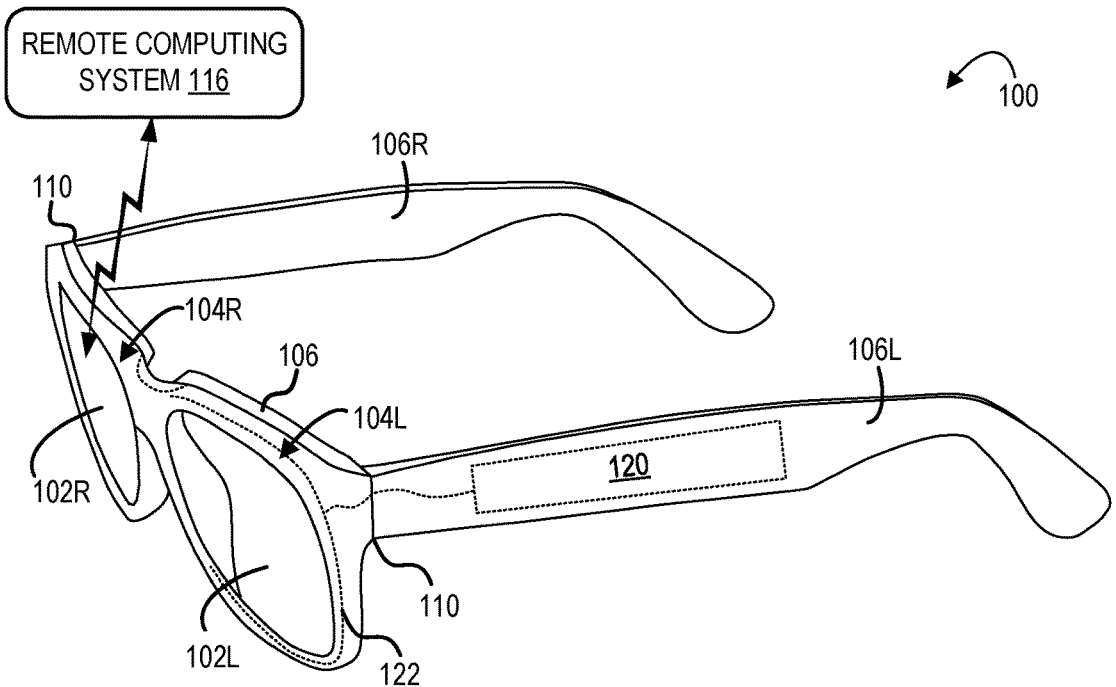
FIG. 1 shows an example wearable display device that includes a transparent antenna.

FIG. 1 shows an example wearable display device 100 that includes a lens system comprising transparent antennas 102L, 102R respectively disposed on a left lens 104L and a right lens 104R, which are supported by a frame 106. Frame 106 is connected to side frames 106L, 106R via optional hinge joints 110. Each of 102L, 102R schematically represents one or more antennas. In some examples, one or more antennas may be located on one of, but not both of, left lens 104L or right lens 104R. The term "lens" is used herein to represent one or more optical components through which a real-world environment can be viewed (e.g. an optical combiner that combines virtual and real imagery, and/or one or more transparent optical components other than a combiner, such as a separate lens with or without optical power). The term "lens system" includes one or more lenses as well as antennas disposed on the one or more lenses.

Each lens 104L, 104R comprises an electrically insulating substrate that is at least partially optically transparent. For example, the substrate may comprise a glass, or an optically transparent plastic such as polycarbonate, polymethyl methacrylate (PMMA), polystyrene, polyethylene terephthalate (PET), cyclic olefin polymer, or other suitable material Transparent antennas 102L, 102R are formed from electrically conductive films that are at least partially optically transparent. The films may comprise one or more electrically conductive materials, such as indium tin oxide (ITO), silver nanowires, silver nanoparticles, carbon nanotubes, graphene, a mixture of two or more such materials (e.g., silver nanoparticle-ITO hybrid), and/or other suitable material(s).

The film(s) may be formed via any suitable process, such as chemical vapor deposition, sputtering, atomic layer deposition, or evaporation. Further, the film may be patterned to form a plurality of individual antenna segments on the lens system. Such a pattern may be formed via any suitable method, examples of which are described below. Trenches between antenna segments may be utilized for placement of conductive traces, also described in more detail below.

As the conductive film may not be fully optically transparent in some examples, the use of relatively thinner films for antennas may provide for greater transparency compared to relatively thicker coatings. However, RF loss may be increased for relatively thinner coatings. As such, the thickness of the conductive film can be selected based on a balance between RF loss and transparency.

In some examples, one or more of antennas 102L, 102R comprises a communication antenna. As such, wearable display device 100 may communicate with a remote computing system 116 via the communication antenna. Remote computing system 116 may comprise any suitable computing system, such as a cloud computing system, a PC, a laptop, a phone, a tablet, etc. The communication antenna may utilize any suitable frequency band for communication (e.g., bands for 4G, 5G, WiFi, WiFi 7, Bluetooth, Bluetooth 5.1, etc.). Further, the communication antenna may comprise switches operable to change the radiation pattern and thus change to a different frequency band.

Alternatively or additionally, in some examples one or more of antennas 102L, 102R comprises a proximity sensing antenna. In combination with circuitry, the proximity sensing antenna is configured to output a signal responsive to a position of a surface proximate to the proximity sensing antenna. For example, the proximity sensing antenna may be connected to a resonant LC circuit that is responsive to changes in capacitance and/or inductance based upon a proximity of the proximity sensing antenna to a human body surface. In other examples, any circuitry capable of measuring S21 or S11 scattering parameters may be used to detect proximity via a proximity sensing antenna signal. In some examples, one or more proximity sensing antennas are configured for facial motion detection. For example, signal data from a plurality of proximity sensing antennas can be input into a trained machine learning function configured to output a most likely facial expression. The proximity sensing antenna may comprise any suitable quality factor (Q factor). In some examples, the proximity sensing antenna comprises a Q factor that is between 150 and 2000. Further, in some examples, a resonant LC circuit may be configured to have a resonant frequency in a range of 100 KHz to 1 MHz. In other examples, any other suitable frequencies and/or Q factors may be used.

In examples where transparent antennas 102L, 102R comprise both a communication antenna and a proximity sensing antenna, the antennas may be configured to utilize different frequency bands. In one example, the communication antenna uses a 2.4 GHz band while the proximity sensing antenna uses a 500 kHz band. In another example, the communication antenna is configured as a WIFI-7 antenna while the proximity sensing antenna senses at 1 MHz. These examples are intended to be illustrative and not limiting.

Wearable display device 100 further may include an image producing system (for example a laser scanner, a liquid crystal on silicon (LCoS) microdisplay, a transmissive liquid crystal microdisplay, an organic light emitting device (OLED) microdisplay, or digital micromirror device (DMD)) to produce images for display. Images displayed via left-eye and right-eye transparent combiners may comprise stereo images of virtual objects overlayed on the real-world scene such that the virtual objects appear to be present in the real-world scene.

Wearable display device 100 further comprises a controller 120. Controller 120 comprises, among other components, a logic subsystem and a storage subsystem that stores instructions executable by the logic subsystem to control the various functions of wearable display device 100, including but not limited to the communication and proximity sensing functions described herein. In various examples example, controller 120 may comprise instructions to send and/or receive signals via a communication antenna, to change a communication frequency band, to receive signal data from the proximity sensing antenna, and to determine (or obtain a determination of) a most likely facial expression using data from one or more proximity sensing antennas, among other functions.

The one or more antennas 102L, 102R may be electrically coupled to processing circuitry, such as one or more resonant LC circuits and/or controller 120. Further, flex cables, printed traces, and/or other suitable electrical connections may be used to connect the antenna on the front frame 106 to processing circuitry on a side frame 106R, 106L via hinges 110. Electrical connections between antennas 102L, 102R and conductors at the device frame may be made via any suitable interconnect. Examples include a metallic plate (e.g. gold, silver, or copper), and relatively large bonding pads having metalized edges (e.g. metalized with copper) to reduce ohmic loss at copper/coating mating points, as the sheet resistivity (ohm/sq) for metals may be 6-7 orders of magnitude smaller than that of the antenna coatings.

Conductors that carry signals from antennas 102L, 102R to other circuitry may be routed through or otherwise along frame 106, as indicated by pathway 122. The signals may comprise communication signals to/from the communication antenna and/or sensor signals from the proximity sensing antenna. In some examples, signals and shield conductors for the signal connections are routed alongside signals from other components, such as a microphone or a camera.

Figure 2:
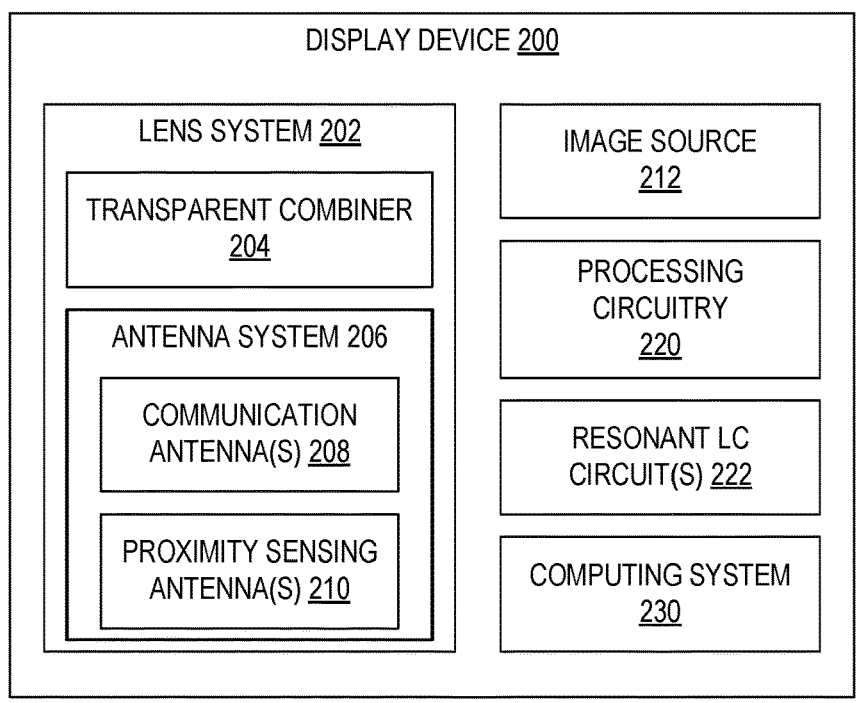
FIG. 2 shows a block diagram of an example display device comprising an antenna.

FIG. 2 shows a block diagram of an example display device 200 comprising an antenna system. Wearable display device 100 is an example of display device 200. Display device 200 comprises a lens system 202 with a transparent combiner 204. Transparent combiner 204 is configured to provide an optical path between an eyebox of display device 200 and an image source 212 to thereby allow a user to view images produced by image source 212 mixed with a real-world background viewable through transparent combiner 204.

Lens system 202 further comprises an antenna system 206. Antenna system 206 may comprise one or more communication antennas 208 and/or one or more proximity sensing antennas 210 formed from a material that is at least partially optically transparent. As such, a user can view imagery delivered from image source 212 via transparent combiner 204 together with real-world imagery visible through the combiner and antenna. The optical transparency may be due to a thickness of an electrically conductive film used to form the antennas, and/or due to a visible light absorption spectrum of the material allowing a substantial proportion of visible light to pass through the film. In some examples, a communication antenna 208 and/or proximity sensing antenna 210 can be formed directly on transparent combiner 204 of the lens system, while in other examples a communication antenna 208 and/or proximity sensing antenna 210 can be formed on another transparent component of the lens system that is configured to be located between the user's eye and real-world environment (e.g., a lens that is separate from the combiner) when display device 200 is worn.

Display device 200 further comprises processing circuitry 220 configured to send and/or receive signals via communication antenna(s) 208, and/or to process data from signals received from communication antenna(s) 208 and/or proximity sensing antenna(s) 210. Display device 200 further comprises a resonant LC circuit 222 for each proximity sensing antenna 210. Each resonant LC circuit 222 is configured to be responsive to changes in capacitance and/or inductance caused by changes in proximity of a surface of a human body to a proximity sensing antenna to which the resonant LC circuit is connected. In some examples, a resonant LC circuit may be configured to have a resonant frequency in a range of 100 KHz to 1 MHz. In some examples, display device may comprise a plurality of resonant LC circuits coupled to a corresponding plurality of proximity sensing antennas. Display device 200 further comprises a computing system 230 comprising a processor and stored instructions executable by the processor to operate the various functions of display device 200. Examples of hardware implementations of computing devices are described below in more detail with regard to FIG. 7.

Figure 3:
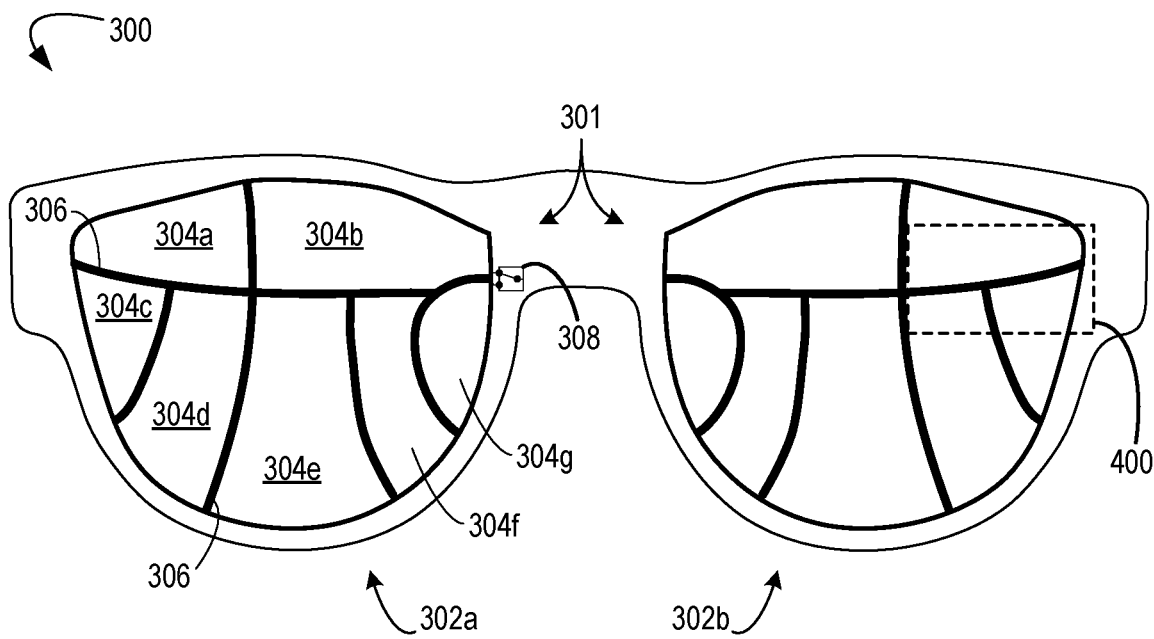
FIG. 3 shows an example antenna layout for a lens system.

FIG. 3 shows a front view of an example wearable device 300 illustrating an example antenna layout 301. Wearable device 300 is an example implementation of display devices 100 and 200. Wearable device 300 includes a lens system comprising lenses 302a and 302b for right and left eyes, respectively. The antenna layout on each lens in this example comprises seven antenna segments formed on a transparent substrate, as described above. While the example depicted comprises seven antenna segments per lens, in other examples, any suitable antenna layout with any suitable number of antenna segments may be used.

As described above, the transparent antennas may comprise one or more communication antennas and/or one or more proximity sensing antennas. Wearable device 300 further may include one or more switches, indicated schematically at 308, to selectively connect antenna segments together. Switches can be used to change the radiation pattern emitted by communication antennas, and thereby change a frequency band used for communication. This may help to support a wider variety of communications bands and protocols.

As shown on lens 302a, antenna segments 304a-g are separated by trench regions 306, indicated by thick dark lines. Trench regions 306 are regions between antenna segments that lack the electrically conductive film(s) that form antenna segments 304a-g. As described in more detail below, in some examples, trench regions 306 may comprise electrically conductive traces to carry signals to and/or from antenna segments 304a-g to other circuitry. Trench regions 306 may be formed by masking followed by deposition of the conductive film for the antenna segments, or by etching after forming the conductive film, in various examples. In some examples, trench regions are etched into the lens or other substrate.

As a conductive film from which the antenna segments 304a-g are formed may not be fully transparent, the antenna layout may be visible to a user in some examples. However, when incorporated into a device configured to be worn on the head, the antenna layout may be positioned closer than a focal length of the human eye during most normal use of wearable device 300. As such, the layout may be out of focus to a user during ordinary device use, and thus may not obstruct the user's view or distract the user.

Figure 4:
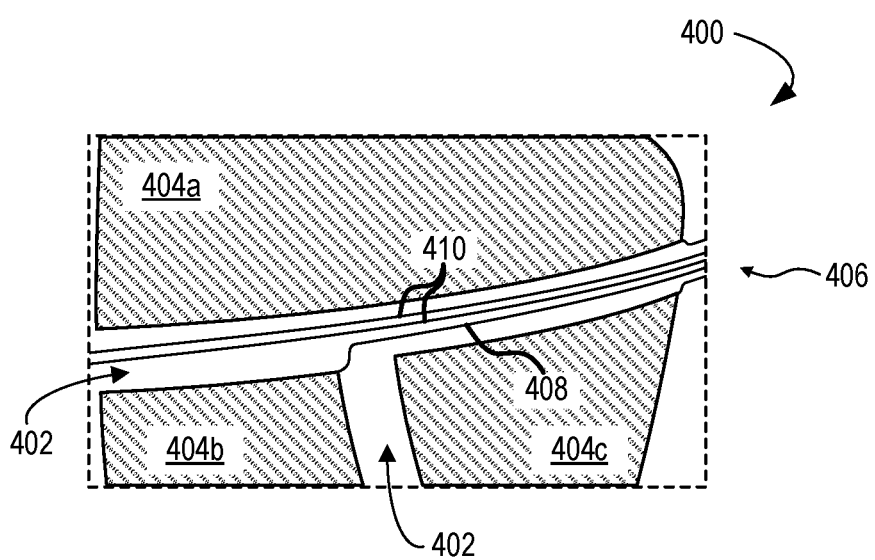
FIG. 4 is an enlarged view of the antenna layout of FIG. 3, showing conductive traces formed within trench regions between antenna segments.

As mentioned above, in some examples, signals may be carried to and/or from the antenna segments on electrically conductive traces. FIG. 4 shows an enlarged view of region 400 of antenna layout 301, schematically showing conductive traces in a trench region 402. FIG. 4 depicts three antenna segments 404a-c, as indicated by hashed areas, and five conductive traces which connect the antenna regions to processing circuitry. As shown, the traces connect to processing circuitry at relatively closely spaced locations, as indicated at 406, which may provide for simpler routing than where the traces connect to other conductors at different locations around a device frame.

The conductive traces are utilized to form electrical connections between various antenna segments and other circuitry. In the depicted example, two conductive traces connect respectively to antenna segments 404a and 404c, while three other conductive traces run through trench region 402. Conductive trace 408 is coupled to antenna segment 404b, while conductive traces 410 connect to other antenna segments not shown in FIG. 4.

The conductive traces may comprise any suitable electrically conductive material, such as a conductive metal. Examples include gold, silver, and copper. In some examples, the conductive traces may comprise a sheet-like aspect ratio. In one illustrative example, the conductive traces comprise a width with a range of 25 μm (microns) to 75 microns and a thickness within a range of 5 to 500 microns. As such, the conductive trace may take advantage of sheet resistance behavior in thin metals. In other examples, conductive traces may have any other suitable dimensions.

Figure 5:
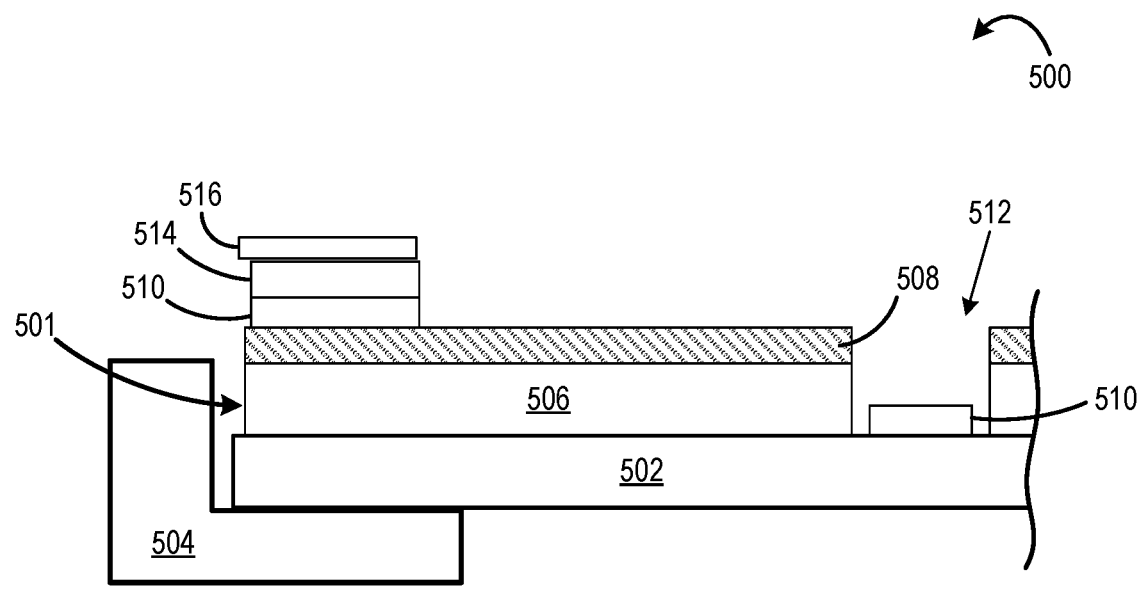
FIG. 5 shows a sectional view of an example antenna formed on an optically transparent substrate.

FIG. 5 is a sectional view of an example device 500 showing material layers of an example antenna 501 formed on a transparent substrate 502. It will be understood that the elements in FIG. 5 are depicted schematically and may not be drawn to scale. Transparent substrate 502 is supported by device frame 504 at an edge. As discussed above, transparent substrate 502 is electrically insulating and may comprise an optically transparent glass, plastic, or other suitable material.

Antenna 501 comprises a conductive film 506 formed on top of transparent substrate 502, the conductive film being at least partially transparent. While substrate 502 is depicted as being relatively flat, the antenna may be formed on a curved surface in some examples. Conductive film 506 may comprise any suitable electrically conductive material, such as ITO, silver nanowires or carbon nanotubes). Conductive film 506 may comprise a plurality of antenna segments with any suitable antenna layout, as mentioned above. An insulating layer 508 is formed on top of conductive film 506. In some examples, insulating layer 508 comprises an anti-reflective material. Further, in some examples, insulating layer 508 comprises a lossy coating material configured to suppress thermal noise.

The device further comprises one or more conductive traces 510 formed on the insulating layer 508 and/or in a trench region 512. Conductive traces 510 may comprise a conductive metal (e.g., Au, Ag, Cu) in some examples. To connect traces 510 with other circuitry, an anisotropic conductive film (ACF) 514 may be applied over conductive traces 510, and a flex printed circuit 516 may be coupled to ACF 514. In other examples, any suitable method may be used to electrically connect a trace with a conductive element. Traces can be used to carry signals for components other than antennas. For example, device 500 may further comprise additional metal traces coupled to other components than antenna segments.

Figure 6:
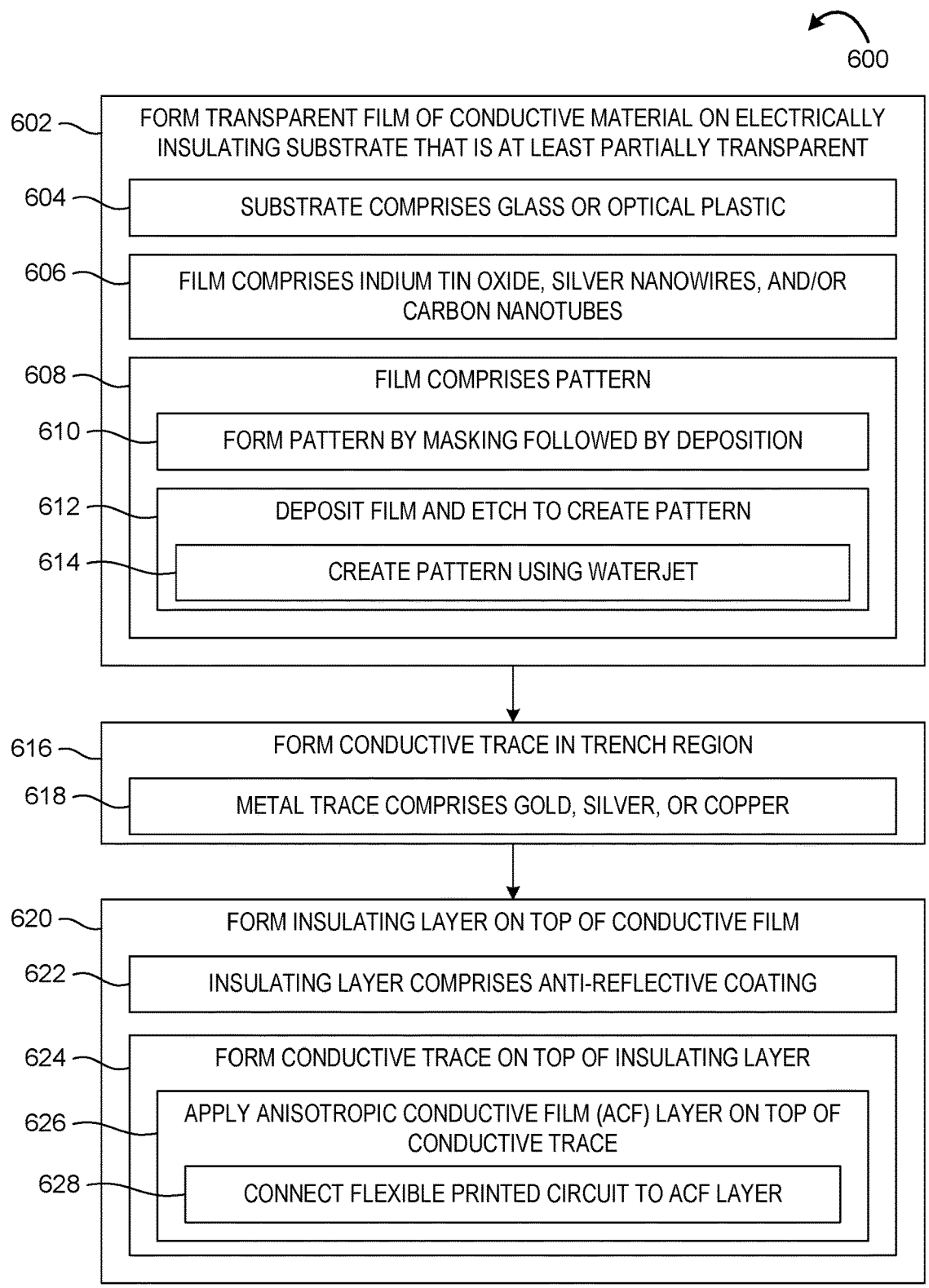
FIG. 6 shows a flow diagram for an example method for forming an antenna on an optically transparent substrate.

FIG. 6 shows a flow diagram of an example method 600 for forming an antenna on a transparent substrate. At 602, the method comprises forming an at least partially transparent film of conductive material on an at least partially transparent, electrically insulating substrate. As discussed above, for some materials that are not fully optically transparent, a relatively thicker film may provide better RF characteristics at the expense of loss of transparency, compared to thinner films. The thickness of the film can be adjusted based on a trade-off between translucency and RF loss. In some examples, at 604, the substrate comprises a glass or optical plastic (e.g., polycarbonate or acrylate). In some examples, at 606, the film comprises one or more of ITO, silver nanowires, or carbon nanotubes.

In some examples, at 608, the film comprises a pattern that defines a layout of antenna segments. In some examples, as indicated at 610, method 600 comprises forming the pattern by first masking trench regions followed by depositing the conductive film. Any suitable deposition method may be employed, such as chemical vapor deposition, sputtering, atomic layer deposition, or evaporation. In other examples, as indicated at 612, the conductive film is first deposited without any masking pattern, and then etched to create the pattern. In some such examples, at 614, a waterjet is used to etch the conductive film and create the pattern. In other examples, lithographic techniques may be used to form a pattern after deposition of the conductive material, and then a suitable wet or dry etching process may be used to form the trenches.

Method 600 further comprises, at 616, forming one or more conductive traces in a trench region of the substrate. In some examples, at 618, the conductive trace comprises a metal such as Au, Ag, or Cu.

Continuing, method 600 further comprises, at 620, forming an insulating layer on top of the conductive film. In some examples, at 622, the insulating layer comprises an anti-reflective coating. In some examples, at 624, the method further comprises forming a conductive trace on top of the insulating layer. Further, in some examples, at 626, the method comprises applying a layer of ACF on top of the conductive trace to form a connection to a flex circuit. In such examples, at 628, the method further comprises connecting a printed circuit to the ACF layer.

While disclosed above in the context of a see-through display device, in other examples an optically transparent antenna according to the disclosed examples may be used in any other suitable context. For example, a transparent antenna can be formed on a window in a building, vehicle, or other space. Such a transparent antenna is coupled to a resonant LC circuit and configured for proximity sensing. The proximity sensing antenna may detect proximate objects at relatively greater distances (e.g., 0-5 feet) compared to capacitive touch sensors (e.g., distances less than 5 mm). Further, a proximity sensing antenna system may be able to distinguish between objects of different sizes.

As another example, a mobile computing device may comprise an antenna formed on the display (e.g., smartphone screen). As the antenna comprises a conductive film that is at least partially transparent, a user may still view the display through the antenna.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
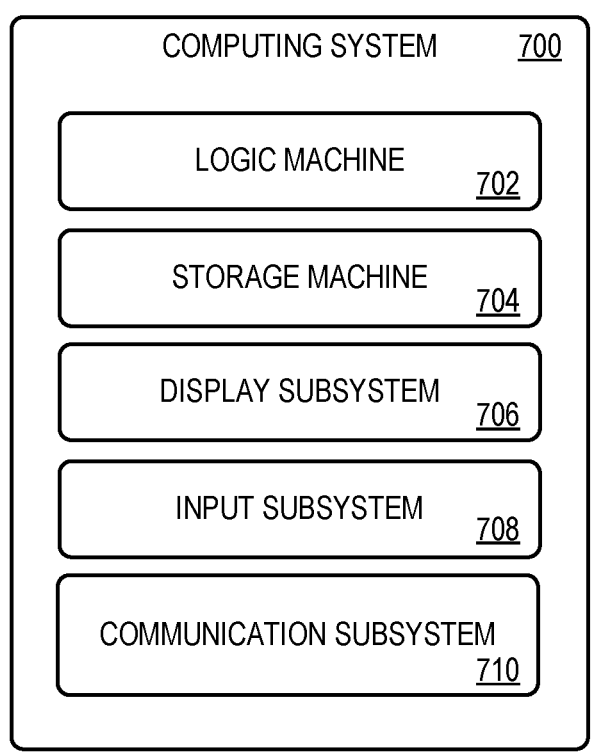
FIG. 7 shows a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program-and application-specific integrated circuits (PASIC/ASICs), program-and application-specific standard products (PSSP/AS- SPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on-or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local-or wide-area network. In some embodiments, the communication subsystem may allow computing system 700 to send and/or receive messages to and/or from other devices via a network such as the Internet.

Another example provides a device comprising an electrically insulating substrate that is at least partially optically transparent, one or more antennas disposed on the electrically insulating substrate, each antenna comprising a film of a conductive material that is at least partially optically transparent, the one or more antennas comprising a communication antenna, and processing circuitry electrically coupled to the communication antenna, the processing circuitry configured to one or more of send or receive signals via the communication antenna. In some such examples, the electrically insulating substrate comprises one or more of glass, polymethyl methacrylate, polystyrene, polyethylene terephthalate, cyclic olefin polymer, or polycarbonate. In some examples the conductive material additionally or alternatively comprises one or more of indium tin oxide, silver nanowires, or carbon nanotubes. In some examples the device additionally or alternatively comprises a head-mounted display device. In some such examples, the one or more antennas additionally or alternatively comprises a proximity sensing antenna and the processing circuitry includes a resonant circuit coupled to the proximity sensing antenna. In some examples the communication antenna additionally or alternatively is configured to utilize a first frequency band for communication and the proximity sensing antenna is configured to utilize a second frequency band for facial motion tracking, the second frequency band being different from the first frequency band. In some examples the one or more antennas additionally or alternatively includes a plurality of thin film segments, and the device further comprises a conductive trace formed in a trench region between a first thin film segment and a second thin film segment. In some examples the device additionally or alternatively comprises an insulating layer located over the film. In some examples the processing circuitry additionally or alternatively is electrically coupled to the communication antenna via one or more of a gold plate, a silver plate, a copper plate, or a metalized bonding pad.

Another example provides a proximity sensor comprising an electrically insulating substrate that is at least partially optically transparent, one or more antennas disposed on the electrically insulating substrate, each antenna comprising a film of a conductive material that is at least partially optically transparent, the one or more antennas comprising a proximity sensing antenna, and a resonant circuit electrically coupled to the proximity sensing antenna, the resonant LC circuit configured to output a signal responsive to a position of a surface relative to the proximity sensing antenna. In some such examples, the one or more antennas comprises a communication antenna, and wherein the proximity sensor further comprises processing circuitry configured to one or more of send or receive signals via the communication antenna. In some examples the proximity sensor additionally or alternatively comprises a lens system incorporated in a head-mounted display device, and the proximity sensing antenna is configured for facial motion tracking. In some such examples, the electrically insulating substrate additionally or alternatively comprises one or more of glass, polymethyl methacrylate, polystyrene, polyethylene terephthalate, cyclic olefin polymer, or polycarbonate. In some such examples, the conductive material additionally or alternatively comprises one or more of indium tin oxide, silver nanowires, or carbon nanotubes. In some such examples, the one or more antennas additionally or alternatively includes a plurality of thin film segments, and further comprising a conductive trace formed in a trench region between a first thin film segment and a second thin film segment. In some such examples, the one or more antennas additionally or alternatively comprise a plurality of thin film segments.

Another example provides a head-mounted computing device comprising a see-through display comprising an electrically insulating substrate that is at least partially optically transparent, and a plurality of antennas formed on the electrically insulating substrate, each antenna being formed from an electrically conductive material that is at least partially optically transparent, the plurality of antennas comprising a communication antenna, and a controller configured to send and receive signals via the communication antenna. In some such examples, the plurality of antennas further comprises a proximity sensing antenna. In some such examples, the communication antenna additionally or alternatively is configured to utilize a first frequency band and the proximity sensing antenna is configured to utilize a second frequency band for facial motion tracking, the second frequency band being different from the first frequency band. In some such examples, the plurality of antennas additionally or alternatively includes a plurality of antenna segments, and further comprising a conductive trace formed in a trench region between a first thin film segment and a second thin film segment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A proximity sensor comprising:
an electrically insulating substrate that is at least partially optically transparent;
one or more antennas disposed on the electrically insulating substrate, each antenna comprising a film of a conductive material that is at least partially optically transparent, the one or more antennas comprising a proximity sensing antenna; and
a resonant LC circuit electrically coupled to the proximity sensing antenna, the resonant LC circuit configured to output a signal responsive to a position of a surface relative to the proximity sensing antenna.

2. The proximity sensor of claim 1, wherein the one or more antennas comprises a communication antenna, and wherein the proximity sensor further comprises processing circuitry configured to one or more of send or receive signals via the communication antenna.

3. The proximity sensor of claim 1, wherein the proximity sensor comprises a lens system incorporated in a head-mounted display device, and wherein the proximity sensing antenna is configured for facial motion tracking.

4. The proximity sensor of claim 1, wherein the electrically insulating substrate comprises one or more of glass, polymethyl methacrylate, polystyrene, polyethylene terephthalate, cyclic olefin polymer, or polycarbonate.

5. The proximity sensor of claim 1, wherein the conductive material comprises one or more of indium tin oxide, silver nanowires, or carbon nanotubes.

6. The proximity sensor of claim 1, wherein the one or more antennas includes a plurality of thin film segments.

7. The proximity sensor of claim 6, further comprising a conductive trace formed in a trench region between a first thin film segment and a second thin film segment.

8. The proximity sensor of claim 7, wherein the conductive trace comprises a width of 25 μm to 75 μm and a thickness of 5 μm to 500 μm.

9. The proximity sensor of claim 1, wherein the resonant LC circuit is configured to have a resonant frequency of 100 KHz to 1 MHz.

10. The proximity sensor of claim 1, further comprising an insulating layer located over the film.

11. A see-through display comprising:
an electrically insulating substrate that is at least partially optically transparent;
one or more antennas disposed on the electrically insulating substrate of the see-through display, each antenna comprising a film of a conductive material that is at least partially optically transparent, the one or more antennas comprising a proximity sensing antenna; and
a resonant LC circuit electrically coupled to the proximity sensing antenna, the resonant LC circuit configured to output a signal responsive to a position of a surface relative to the proximity sensing antenna.

12. The see-through display of claim 11, wherein the one or more antennas includes a plurality of thin film segments, and further comprising a conductive trace formed in a trench region between a first thin film segment and a second thin film segment.

13. The see-through display of claim 11, wherein the proximity sensing antenna is configured for facial motion tracking.

14. The see-through display of claim 11, wherein the electrically insulating substrate comprises one or more of glass, polymethyl methacrylate, polystyrene, polyethylene terephthalate, cyclic olefin polymer, or polycarbonate.

15. The see-through display of claim 11, wherein the conductive material comprises one or more of indium tin oxide, silver nanowires, or carbon nanotubes.

16. The see-through display of claim 11, wherein the resonant LC circuit is configured to have a resonant frequency of 100 KHz to 1 MHz.

17. A head-mounted computing device comprising:
a see-through display comprising
an electrically insulating substrate that is at least partially optically transparent, and
a plurality of antennas formed on the electrically insulating substrate, each antenna being formed from an electrically conductive material that is at least partially optically transparent, the plurality of antennas comprising a communication antenna and a proximity sensing antenna;
a resonant LC circuit electrically coupled to the proximity sensing antenna, the resonant LC circuit configured to output a signal responsive to a position of a surface relative to the proximity sensing antenna; and
a controller configured to send and receive signals via the communication antenna, wherein the communication antenna is configured to utilize a first frequency band and the proximity sensing antenna is configured to utilize a second frequency band for facial motion tracking, the second frequency band being different from the first frequency band.

18. The head-mounted computing device of claim 17, wherein the electrically insulating substrate comprises one or more of glass, polymethyl methacrylate, polystyrene, polyethylene terephthalate, cyclic olefin polymer, or polycarbonate.

19. The head-mounted computing device of claim 17, wherein the conductive material comprises one or more of indium tin oxide, silver nanowires, or carbon nanotubes.

20. The head-mounted computing device of claim 17, wherein the plurality of antennas includes a plurality of thin film segments, and further comprising a conductive trace formed in a trench region between a first thin film segment and a second thin film segment.

* * * * *